US012737167B2

(12) United States Patent
Shailabh et al.

(10) Patent No.: US 12,737,167 B2
(45) Date of Patent: Sep. 15, 2026

(54) TEMPLATE TRANSPILATION TOOL

(71) Applicant: Adobe Inc., San Jose, CA (US)

(72) Inventors: Shashank Shailabh, Muzaffarpur (IN); Chetan Mehrotra, Nodia (IN)

(73) Assignee: Adobe Inc., San Jose, CA (US)

( * ) Notice: Subject to any disclaimer, the term of this patent is extended or adjusted under 35 U.S.C. 154(b) by 328 days.

(21) Appl. No.: 18/392,474

(22) Filed: Dec. 21, 2023

(65) Prior Publication Data

US 2025/0208842 A1 Jun. 26, 2025

(51) Int. Cl.
*G06F 8/51* (2018.01)
*G06F 8/41* (2018.01)

(52) U.S. Cl.
CPC ................ *G06F 8/51* (2013.01); *G06F 8/427* (2013.01)

(58) Field of Classification Search
CPC .................................. G06F 8/51; G06F 8/427
USPC .......................................................... 717/137
See application file for complete search history.

(56) References Cited

U.S. PATENT DOCUMENTS 9,026,903 B1* 5/2015 Michael ................ G06F 40/154 715/235
2012/0191546 A1* 7/2012 Phelan ............... G06Q 30/0271 705/14.66
2014/0282373 A1* 9/2014 Garza ........................ G06F 8/51 717/106
2014/0282444 A1* 9/2014 Araya ........................ G06F 8/42 717/143
2022/0414325 A1* 12/2022 Bhatnagar ............. G06F 40/166
2024/0129066 A1* 4/2024 Zhou ........................ H04L 1/189

OTHER PUBLICATIONS

Espina, E., "Logic-Less and semantic templates with Java", Handlebars. Java, Available online at : https://jknack.github.io/handlebars.java/>, 1 page.
Sparkpost: "The SparkPost API provides a powerful handlebars-style template language that you can use in the email subject, headers, text, HTML, and AMP HTML content", Available online at : <: https://developers.sparkpost.com/api/template-language/>, 24 pages.

* cited by examiner

*Primary Examiner* — Wei Y Mui
*Assistant Examiner* — Amir Soltanzadeh
(74) *Attorney, Agent, or Firm* — Shook, Hardy & Bacon L.L.P.

(57) ABSTRACT

In various examples, content is generated using a first programming language and transpiled to generate transpiled content in a second programming language. In addition, in such examples, substitution data is generated based on personalization data. Furthermore, in one example, the transpiled content and the substitution data are provided to a delivery agent to render or otherwise deliver personalized content to a set of recipients.

20 Claims, 8 Drawing Sheets

TRANSPILATION TOOL 204

CONTENT 228

ABSTRACT SYNTAX TREE (AST) 226

PERSONALIZATION DATA 232

CONTEXT 208

SUBSTITUTION LISTENER

218

RENDERER 216

TRANSPILATION LISTENER

212

TRANSPILED AST 238

SUBSTITUTION DATA 222

TRANSPILED CONTENT 224

DELIVERY AGENT 210

400
CONTENT
Check segment:{{#with profile.person.name as |name|}}
{%#unless contains(trim(name.firstName),"Ferrari") %}
{{#with name.firstName as |n|}}
{%let temp = replaceAll(concat("Hi, ",n.camelCase()), "Ken", "ford").titleCase() %}
{{temp}} {%= camelCase(name.lastName) %}
{{/with}}
{%else%}
Default
{%/unless%}
{{/with}}
428
TRANSPILED CONTENT
Check segment:
{{#if b_2_53}}
{{{var_5_2}}} {{{svar_5_9}}}
{{else}}
Default
{{/if}}
424
404
TRANSPILATION TOOL
{
"person": {
"name": {
"firstName": "ken",
"lastName": "miles"
}
}
}
432
PERSONALIZATION DATA
{
"b_1_53":true,
"b_2_53":true,
"b_3_31":true,
"var_5_2":"Hi, Ford",
"svar_5_9":"Miles"
}
422
SUBSTITUTION DATA

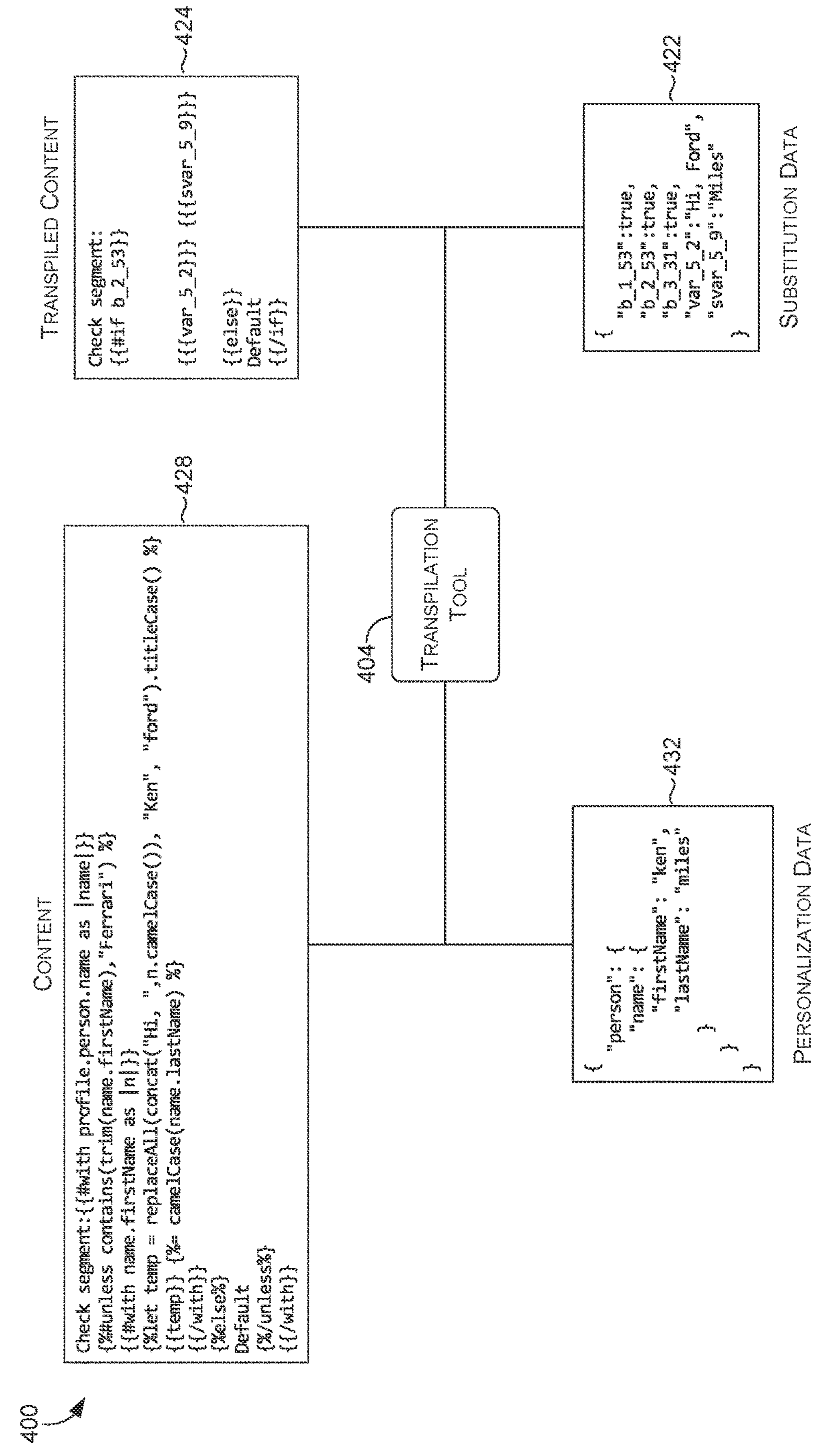

FIG. 4

TEMPLATE TRANSPILATION TOOL

BACKGROUND

Efforts have been made to personalize content for different users such that it is more desirable to review. Such efforts to personalize content for different users has generally included adapting style, tone, and vocabulary. Furthermore, modifying content to tailor the content to different user segments can be valuable as personalized content tailored for an individual may be more engaging, or of interest, to users. Personalizing content, however, generally adds to the complexity and cost associated with generating, rendering, and transmitting the personalized content.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things, transpiling content from a first programming language supported by a journey management service to a second programming language supported by a delivery agent to enable the delivery agent to render the content and deliver the rendered content to a set of recipients. In one example, users of the journey management service use a templating programming language (e.g., through a user interface) to generate content (e.g., a template for content) that is used to render a plurality of communications (e.g., HyperText Markup Language [HTML], e-mail, images, text, video, audio, multi-media, or other forms of communication) for delivery to a plurality of recipients. In addition, in some examples, the journey management service or other entity maintains personalization data that is used to personalize the content (e.g., generate a personalized communication directed to a particular recipient). Accordingly, the delivery agent, in such examples, is capable of efficiently rendering content for batch delivery to the recipients. Therefore, to utilize the efficiencies of the delivery agent, in such examples, the content generated using the templating programming language is transpiled to the delivery agent programming language, and substitution data is generated based on the personalization data. The transpiled content and substitution data, for example, are then used by the delivery agent to transmit personalized content to the plurality of recipients.

BRIEF DESCRIPTION OF THE DRAWINGS

The present disclosure is described in detail below with reference to the attached drawing figures, wherein:

FIG. 4 depicts an environment in which transpiled content and substitution data are generated, in accordance with at least one embodiment.

DETAILED DESCRIPTION

Figure 1:
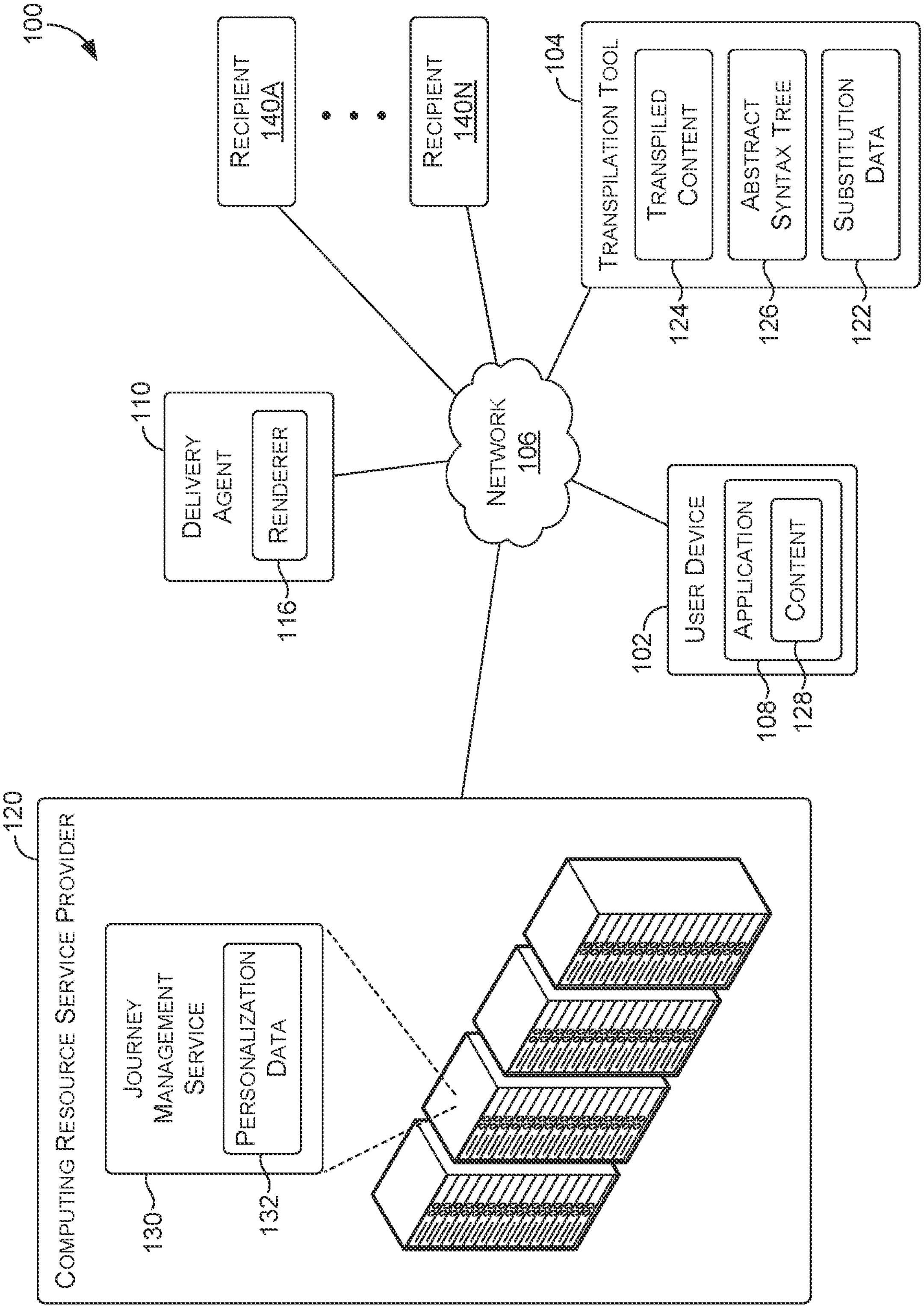
FIG. 1 depicts an environment in which content is transpiled, and substitution data is generated for use by one or more entities, in accordance with at least one embodiment.

Various terms are used throughout this description. Definitions of some terms are included below to provide a clearer understanding of the ideas disclosed herein.

As used herein, a "journey" and/or "customer journey" refers to a series of interactions a customer has with a company across various channels over time. For example, these interactions (e.g., events) include website/mobile application visits, clicking an advertisement, social media interactions, email communications, such as opening an e-mail, visiting a physical store or location, adding an item to an online cart, abandoning a cart, downloading a product for a free trial, checking out and purchasing the item, requesting help, text messages, chat communications, or any interaction a customer initiates with a business. In various embodiments, journeys occur over various channels, such as e-mail, phone calls/texting, social media, websites, physical locations, and any channel in which a customer and business interact.

As used herein, "personalization data" includes any data regarding or otherwise associated with a customer or customers that is obtained or determined, such as location information of mobile device(s), smartphone data (such as phone state, charging data, date/time, or other information derived from a smartphone), activity information (e.g., application usage; online activity; searches; browsing certain types of webpages; listening to music; taking pictures; voice data such as automatic speech recognition; activity logs; communications data including calls, texts, instant messages, and emails; website posts; other user data associated with communication events) including activity that occurs over more than one device, user history, session logs, application data, contacts data, calendar and schedule data, notification data, social network data, news (including popular or trending items on search engines or social networks), online gaming data, ecommerce activity, including customer journey data, sports data, health data, and nearly any other source of data that may be correlated to the customer or otherwise associated with the customer.

As used herein, a "journey management service" enables the generation of personalized content for interactions with users across a plurality of channels as part of a customer journey. For example, personalized content is generated using the content to produce a plurality of different forms and/or formats of interactions In an embodiment, the journey management service includes, supports, or otherwise provides the templating programming language to enable efficient generation of the content through the generation of executable code (e.g., using the templating programming language) For example, the journey management service supports a templating programming language, and the content is written in the templating programming language As used herein, a "delivery agent" enables users of the journey management service to batch and/or otherwise delivery personalized content to a plurality of recipients. For example, the delivery agent includes a renderer, which renders or otherwise generates a set of personalized content based on transpiled content and substitution data. In various embodiments, the delivery agent generates a batch of personalized content by at least compiling or otherwise generating machine-executable code based on source code written in the delivery agent programming language.

As used herein, "transpilation" includes a process of converting source code or other executable instruction written in a first programming language into a second programming language, where the first programming language and second programming language have a similar level of abstraction. In various embodiments, the conversion process is performed by a transpiler or transcompiler. In accordance with aspects described herein, a transpiler or transcompiler is configured to transpile content from a template programming language used by a journey management service to a delivery programming language used by a delivery agent.\

As used herein, "abstract syntax tree" (AST) includes a tree-like representation of the abstract syntactic structure of content by at least breaking down or otherwise reducing content of a programming language into discrete portions. For example, nodes of AST denote a construct occurring in the text of the content and represent the structure or content-related information of the content. Furthermore, syntactic construct such as conditional statements (e.g., an if-condition-then statement) are denoted with a single node with branches (e.g., three branches for the if-condition-then statement). In this manner, the AST represent the structure of the content (e.g., the structure of the source code).

As used herein, "substitution data" is a reduced form of personalization data associated with the customer that includes values associated with variables and corresponds to control blocks within the transpiled content. In one example, the substitution data includes a value associated with a variable in the transpiled content. The substitution data includes data stored in a structured data object that is used by a renderer and/or delivery agent to render personalized content based on transpiled content.

As used herein, "transpiled content" is an equivalent source code transpiled and/or converted a different programming language. For example, the transpiled content is generated by a process of converting source code or other executable instruction written in a first programming language into a second programming language, where the first programming language and second programming language have a similar level of abstraction. Transpiled content is used when a target environment supports a limited number of programming language or supports a programming language that has limited features.

As used herein, "personalized content" includes content generated using personalization data based on a template or other executable instructions. For example, personalized content includes targeting advertisements, sending email communications to the customer, sending follow-up email communications to the customer, initiating a phone call with the customer, sending confirmation email of a product purchase, requesting a product review, cross-selling other products, sending a communication regarding an abandoned cart with or without discounts, or any other interaction a business/marketer desires in response to a customer's interaction with the business.

As used herein, "content" comprises the various types of materials and information created and used by an entity to promote its products, services, brand, and/or ideas to its target audience. Content can take many forms and be distributed through various channels. By way of example only and not limitation, content can include blog posts, social media posts, email marketing, webpages, press releases, advertisements, interactive content, infographics, and whitepapers. Furthermore, content can be represented by source code or other executable instructions (e.g., a template) that, when executed by a processor, causes the processor to render the content. In one example, the content includes a template written in a templating programming language that, when rendered, causes personalized content to be generated.

Content is generally recognized as more valuable when it resonates with the audience's unique interests; however, personalizing content is time consuming especially when distributing to a large audience. Furthermore, journey management services provide users with access to a templating programming language that can be used to generate content for distribution to customers where the content can be personalized based on personalization data (e.g., data associated with a particular customer) according to the template. In addition, delivery agents can be used to render and distribute content to a plurality of recipients. However, delivery agents require source code to be written in the delivery agent programming language and do not support templating programming languages of the journey management services. As such, combining templates for generating personalized content with delivery agents abilities to render batches of content for deliver can be valuable as the personalized content may be more engaging and more likely to be received by the individuals. However, as mentioned above, the delivery agents do not support templating programming languages and/or support programming languages that only include basic functionality that makes generating personalized content tedious and time-consuming.

In some conventional implementations, content creation processes require the rendering of personalized content prior to distribution to a delivery agent or similar communication channel. Rendering personalized content in this manner is time-consuming and requires valuable computing resources. Aspects of the technology described herein improve the functioning of the computer itself in light of these shortcomings in existing approaches for personalized content delivery by providing a solution for transpiling content generated in a templating programming language used by a journey management service to a delivery agent programming language used by a delivery agent to enable the delivery agent to generate personalized content for delivery. In accordance with some aspects, the systems and methods described are directed to generating transpiled content from content and substitution data based on personalization data. The delivery agent then generates a batch of personalized content for delivery to a plurality of recipients based on the transpiled content and the substitution data.

In one example, the templating programming language includes additional functionality that is not included or otherwise provided by the delivery agent programming language. As a result, in an embodiment, a transpilation tool enables the conversion of source code written in the templating programming language to the delivery agent programming language. In an embodiment, the user interacts with a journey management service to generate the content and the transpilation tool generates transpiled content and substitution data. In one example, a transpilation listener translates or otherwise transpiles functionality from the templating programming language to the delivery agent programming language.

Similarly, in various embodiments, a substitution listener generates substitution data during the process of rendering content by the journey management service. In one example, the substitution data is generated based on personalization data collected by the substitution listener. In various embodiments, the transpiled content (e.g., the template created by the user and converted to the delivery agent programming language) and a plurality and/or batch of substitution data (e.g., substitution data for each recipient) is provided to the delivery agent, the delivery agent then renders personalized content based on the transpiled content and batch of substitution data and delivers the personalized content to the recipients.

Advantageously, generating transpiled content and substitution data to provide to a delivery agent reduces computing resource consumption, such as compute capacity and computer memory. In addition, users are able to take advantage of a feature-rich programming language that is easier and more efficient to use when generating content and/or a template for content. Particular embodiments described in the present disclosure leverage transpilation to the delivery agent programming language to enable generation and distribution of personalized content at scale. Accordingly, one technical solution is that embodiments can utilize delivery agent programming language to enable the delivery agent to efficiently render and distribute personalized content to recipients. Another technical solution is allowing users to take advantage of the feature-rich templating programming language. As such, embodiments described herein improve computing resource consumption, such as compute capacity and computer memory, by at least leveraging delivery agents and other communication channels to generate personalized content based on transpiled content and substitution data.

The technology described herein is described with specificity to meet statutory requirements. However, the description itself is not intended to limit the scope of this patent. Rather, the inventors have contemplated that the claimed subject matter might also be embodied in other ways, to include different steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Turning to FIG. 1, FIG. 1 is a diagram of an operating environment 100 in which one or more embodiments of the present disclosure can be practiced. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory, as further described with reference to FIG. 8.

It should be understood that operating environment 100 shown in FIG. 1 is an example of one suitable operating environment. Among other components not shown, operating environment 100 includes a user device 102, transpilation tool 104, delivery agent 110, computing resource service provider 120, a journey management service 130, a set of recipients 140A-140N, and a network 106. Each of the components shown in FIG. 1 can be implemented via any type of computing device, such as one or more computing devices 800 described in connection with FIG. 8, for example. These components can communicate with each other via network 106, which can be wired, wireless, or both. Network 106 can include multiple networks, or a network of networks, but is shown in simple form so as not to obscure aspects of the present disclosure. By way of example, network 106 can include one or more wide area networks (WANs), one or more local area networks (LANs), one or more public networks such as the Internet, and/or one or more private networks. Where network 106 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 106 is not described in significant detail.

It should be understood that any number of devices, servers, and other components can be employed within operating environment 100 within the scope of the present disclosure. Each can comprise a single device or multiple devices cooperating in a distributed environment. For example, the transpilation tool 104 and/or journey management service 130 includes multiple server computer systems cooperating in a distributed environment to perform the operations described in the present disclosure.

User device 102 can be any type of computing device capable of being operated by an entity (e.g., individual or organization) and obtains data from the transpilation tool 104, journey management service 130, and/or a data store that can be facilitated by the computing resource service provider 120 (e.g., a server operating as a frontend for the data store). The user device 102, in various embodiments, has access to, maintains, or otherwise generates content 112, which can be used to generate personalized content based on personalization data 132 for recipients of the set of recipients 140A-140N. For example, the application 108 allows users (e.g., a marketer or business designing customer journeys) to generate the content 128. Continuing this example, the content 128 includes templates for customer journeys.

In some implementations, user device 102 is the type of computing device described in connection with FIG. 8. By way of example and not limitation, the user device 102 can be embodied as a personal computer (PC), a laptop computer, a mobile device, a smartphone, a tablet computer, a smart watch, a wearable computer, a personal digital assistant (PDA), an music player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors and one or more computer-readable media. The computer-readable media can also include computer-readable instructions executable by the one or more processors. In an embodiment, the instructions are embodied by one or more applications, such as application 108 shown in FIG. 1. Application 108 is referred to as a single application for simplicity, but its functionality can be embodied by one or more applications in practice.

In various embodiments, the application 108 includes any application capable of facilitating the exchange of information between the user device 102, the journey management service 130, and/or the transpilation tool 104. For example, the application 108 operating on user device 102 can generally be any application capable of designing customer journeys and/or content 128 used during customer journeys. In some implementations, the application 108 comprises a web application, which can run in a web browser, and can be hosted at least partially on the server-side of the operating environment 100 (e.g., the computing resource service provider 120). In addition, or instead, the application 108 can comprise a dedicated application, such as an application being supported by the user device 102 and the journey management service 130. In some cases, the application 108 is integrated into the operating system (e.g., as a service). It is therefore contemplated herein that "application" be interpreted broadly. Examples of applications that may be used to manage generation, design, and/or execution of communications include Adobe® Journey Optimizer and Adobe® Experience Platform.

For cloud-based implementations, for example, the application 108 is utilized to interface with the functionality implemented by the journey management service 130 and/or the transpilation tool 104. In some embodiments, the components, or portions thereof, of the transpilation tool 104 are implemented on the user device 102 or other systems or devices. In yet other embodiments, the components, or portions thereof, of the transpilation tool 104 are implemented using computing resources of the computing resource service provider 120. Thus, it should be appreciated that the transpilation tool 104, in some embodiments, is provided via multiple devices arranged in a distributed environment that collectively provide the functionality described herein. Additionally, other components not shown can also be included within the distributed environment.

As illustrated in FIG. 1, the transpilation tool 104 includes transpiled content 124, an abstract syntax tree (AST) 126, and substitution data 122. Furthermore, in various embodiments, the content 128 includes source code or other executable instructions written in a first programming language. In one example, the journey management service 130 supports a templating programming language, and the content 128 is written in the templating programming language. In addition, the content 128, in an embodiment, is used to generate personalized content, based on the personalization data 132, for a set of recipients 140A-140N. For example, the personalized content is part of a customer journey. Furthermore, the personalized content, in an embodiment, is distributed or otherwise transmitted by a delivery agent 110. As illustrated in FIG. 1, the delivery agent 110 includes a queue 114 and a renderer 116.

Journey management service 130, in various embodiments, enables the generation of personalized content for interactions with users across a plurality of channels as part of a customer journey. For example, personalized content is generated using the content 128 to produce a plurality of different forms and/or formats of interactions such as Hyper-Text Markup Language (HTML), images, text, video, audio, multi-media, or other forms of distributed content, which is then distributed over a set of channels (e.g., e-mail, text message, direct mail, targeted advertisement, chat communication, voice call, or other communication channel). In an embodiment, the journey management service 130 includes, supports, or otherwise provides the templating programming language to enable efficient generation of the content 128 through the generation of executable code (e.g., using the templating programming language) that, as a result of being executed by a processor (e.g., the processor of a server computer system), causes the processor to execute operations to generate or otherwise render the personalized content.

In an embodiment, the content 128 is input and displayed via a graphical user interface provided via the application 108. For example, as illustrated below in FIG. 3, the content 128 includes an event, conditional statement, or other control operation that triggers actions based on certain conditions in the personalization data 132. In a specific example, as illustrated below in FIG. 4, the content 128 includes an "unless" conditional statement that causes a first portion of the personalized content to be rendered if the personalization data 132 includes a particular value and causes a second portion of the personalized content to be rendered if the personalization data 132 does not include a particular value.

In various embodiments, the customer journey refers to a series of interactions a customer has with a company across various channels over time. For example, these interactions (e.g., events) include website/mobile application visits, clicking an advertisement, social media interactions, email communications, such as opening an e-mail, visiting a physical store or location, adding an item to an online cart, abandoning a cart, downloading a product for a free trial, checking out and purchasing the item, requesting help, text messages, chat communications, or any interaction a customer initiates with a business. In various embodiments, customer journeys occur over various channels, such as e-mail, phone calls/texting, social media, websites, physical locations, and any channel in which a customer and business interact.

Business or marketers can design content 128 to create targeted, personalized communications for customers (e.g., the set of recipients 140A-140N) based on personalization data 132 (e.g., specific actions taken by the customer or information associated with the customer), in an embodiment, thereby improving customer engagement and conversion rates. In one example, the content 128 designed by the business/marketer (e.g., using the application 108) includes interactions with the customer (e.g., actions or responses) in response to interactions by the customer (e.g., events). For example, these interactions (e.g., actions or responses) by the business include personalizing the content 128 for the customer based on the personalization data 132. In various embodiments, the personalized content includes targeting advertisements, sending email communications to the customer, sending follow-up email communications to the customer, initiating a phone call with the customer, sending a confirmation email of a product purchase, requesting a product review, cross-selling other products, sending a communication regarding an abandoned cart with or without discounts, or any other interaction a business/marketer desires in response to a customer's interaction with the business.

In one example, the interactions between the business and a customer during a customer journey creates a distinctive customer journey experience, which increases the likelihood that the customer will repeat a purchase with a business, spend more with the business, recommend the business or product to others, and maintain loyalty to the business. Distribution of personalized content during customer journeys, for example, is slow and time-consuming. In addition, continuing this example, distribution of personalized content utilizes computing resources of the journey management service 130. In various embodiments, users of the journey management service 130 can increase the speed of distribution of personalized content and reduce the use of computing resources by utilizing the delivery agent 110 to generate and distribute the personalized content.

In various embodiments, the journey management service 130 or other service of the computing resource service provider 120 collects, receives, or otherwise maintains personalization data 132. In one example, the personalization data 132 includes any data regarding or otherwise associated with a customer or customers that is sensed or determined from one or more sensors, such as location information of mobile device(s), smartphone data (such as phone state, charging data, date/time, or other information derived from a smartphone), activity information (e.g., application usage; online activity; searches; browsing certain types of webpages; listening to music; taking pictures; voice data such as automatic speech recognition; activity logs; communications data including calls, texts, instant messages, and emails; website posts; or other user data associated with communication events) including activity that occurs over more than one device, user history, session logs, application data, contacts data, calendar and schedule data, notification data, social network data, news (including popular or trending items on search engines or social networks), online gaming data, e-commerce activity, including customer journey data, sports data, health data, and nearly any other source of data that may be used to identify the customer.

Although the personalization data 132 as shown in FIG. 1 is maintained by the journey management service 130, in some embodiments, the personalization data 132 used as a basis for generating the personalized content is provided via other data sources and/or additional data sources. In such embodiments, the data sources include any type of computing devices at which customer data is generated or stored. In one specific example, a first data source includes a service that collects and maintains user data for use, searching, viewing, and/or analysis. In another example, the data source includes a data store (e.g., relational database) that maintains user data such as interactions, communications, preferences, or any other user data that can be used to generate the personalized content. In various embodiments, the data sources provide customer data to the journey management service 130 for storage as personalization data 132 (e.g., in a relational database, structure data object, or other storage). In other embodiments, the data sources provide the personalization data to the transpilation tool 104 during generation of the substitution data 122.

Transpilation tool 104, in various embodiments, includes a transpiler that obtains the content 128 (e.g., source code written in a programming language) as an input and produces the transpiled content 124 (e.g., an equivalent source code in a different programming language). Transpilation is a process of converting source code or other executable instruction written in a first programming language into a second programming language, where the first programming language and second programming language have a similar level of abstraction. In various embodiments, the conversion process is performed by a transpiler or transcompiler. For example, transpilation is required when a target environment (e.g., the delivery agent 110 environment) supports a limited number of programming language or supports a programming language that has limited features. In various embodiments, the templating programming language provides additional functionality and/or features that make generating the content 128 (e.g., a template or other source code that is used to generate the personalized content) easier and more efficient for users as opposed to other programming languages (e.g., the delivery agent programming language) that do not include these additional functions and/or features.

In order to generate the transpiled content 124, in various embodiments, the transpilation tool 104 parses the content 128 (e.g., source code) by at least generating a set of tokens corresponding to the content 128, where the tokens represent building blocks or other components of the programming language. For example, tokens include programming language keywords, variables, literals, and operators. Furthermore, to generate the transpiled content 124, lexical analysis (e.g., breaking the input into tokens) and syntax analysis (e.g., constructing a parse tree from these tokens based on the rules of the language) are performed in at least one embodiment. As illustrated in FIG. 1, in various embodiments, the AST 126 is generated based on the content.

In one example, the AST 126 includes a tree-like representation of the abstract syntactic structure of the content 128 (e.g., the text of the source code written in the templating programming language). Continuing this example, the nodes of AST 126 denote a construct occurring in the text of the content 128 and represent the structure or content-related information of the content 128. In an embodiment, syntactic constructs such as conditional statements (e.g., an if-condition-then statement) are denoted with a single node with branches (e.g., three branches for the if-condition-then statement). In this manner, in such embodiments, the AST 126 represent the structure of the content 128 (e.g., the structure of the source code). In various embodiments, the transpilation tool 104 uses the AST 126 to determine an order of code snippets (e.g., portions of the source code) included in the content 128.

In various embodiments, the transpilation tool 104 then transform the AST 126 from the source programming language (e.g., the templating programming language) to the target programming language (e.g., delivery agent programming language). For example, the AST 126 is transformed according to rules of the target programming language, including changing the structure of the code, renaming variables, and/or replacing certain constructs (e.g., conditional statements and/or control structures) with equivalents in the target language. In various embodiments, a component of the transpilation tool 104 (e.g., a renderer) transverses the AST 126 starting with a root node and transforms the nodes based on the rules associated with the target language. Once the AST 126 is transformed to the target programming language, the transpilation tool 104, in an embodiment, generates source code in the target programming language from the transformed AST 126. In one example, the transpilation tool 104 maintains the level of abstraction and the transpiled content 124 (e.g., the output source code generated based on the transformed AST 126) is human-readable and cannot be executed directly (e.g., without invoking a compiler or interpreter of the delivery agent programming language).

In various embodiments, the substitution data 122 is generated based on the AST 126 and the personalization data 132. In various embodiments, a component of the transpilation tool 104 (e.g., the renderer) transverses the AST 126 starting with a root node and collects the personalized data within the transpiled content to obtain personalized content and stores the data as substitution data 122. As described below in connection with FIG. 2, in an embodiment, rendering the content 128 includes generating a context, which is a data structure, including a portion of the personalization data 132 determined based on the content 128. In various embodiments, the transpilation tool 104 resolves or otherwise calculates the values for variables including inputs and outputs to nodes of the AST 126 and variables used within the node and stores the results in the substitution data 122.

In addition, in an embodiment, the transpilation tool 104 or component thereof (e.g., a substitution listener, as described in greater detail below in connection with FIG. 2) determines variable names for the values computed and/or control operations (e.g., "if" statement) such that the variable names are unique relative to the content 128. For example, if a node of the AST 126 represents a particular conditional statement in the source code of the content 128, the result of the particular conditional statement (e.g., the value computed based on the conditional statement and an instance of personalization data 132) is determined and stored corresponding to a particular variable name in the substitution data 122. In an embodiment, an algorithm defines the method for determining or otherwise computing unique variable names for the content 128. In one example, the algorithm defines a text value for various components of the content 128 (e.g., "var" for variable, "b" for conditional blocks, and/or "eb" for control loops, etc.) and defines a numerical value to append to the text based on a location within the content (e.g., a row and column of a particular variable). In various embodiments, the same algorithm is used to generate variable names in the transpiled content 124 and the substitution data 122. Furthermore, the process of computing variable names and corresponding values within the content 128 is performed for each instance of personalization data 132 (e.g., each recipient of the set of recipients 140A-140N of the personalized content).

In various embodiments, the transpiled content 124 and the substitution data 122 are provided to the delivery agent 110 for distribution of the set of recipients 140A-140N. In one example, the delivery agent 110 includes a renderer 116, which renders or otherwise generates a set of personalized content based on the transpiled content 124 and the substitution data 122. In an embodiment, the delivery agent 110 includes a computing device, such as one or more computing devices 800 described in connection with FIG. 8, executing SparkPost®, Mailchimp®, Elastic Email®, or any communication system that supports templating with substitution data 122 and batching of communication messages (e.g., e-mail, text messages, chat messages, etc.).

In various embodiments, the delivery agent 110 or component thereof, such as the renderer 116, generates a batch of personalized content by at least compiling or otherwise generating machine-executable code based on the transpiled content 124 (e.g., source code written in the delivery agent programming language) and executing the code using the substitution data 122. As described above, in an embodiment, the substitution data 122 includes data generated based at least in part on the personalized data 132 and includes an instance of substitution data 122 (e.g., JavaScript Object Notation [JSON] data object) for each recipient of the set of recipients 140A-140N to which the personalized content is to be delivered.

In addition, in various embodiments, the substitution data 122 include values associated with variables and results corresponding to control blocks within the transpiled content 124. In one example, the substitution data 122 includes a value associated with a variable in the transpiled content 124. In another example, the substitution data 122 includes the results of a control block such as an "each" statement (e.g., eb_1_32="true," where eb_1_32 is the variable name for a result of the "each: statement in the substitution data 122 and the transpiled content 124).

Figure 2:
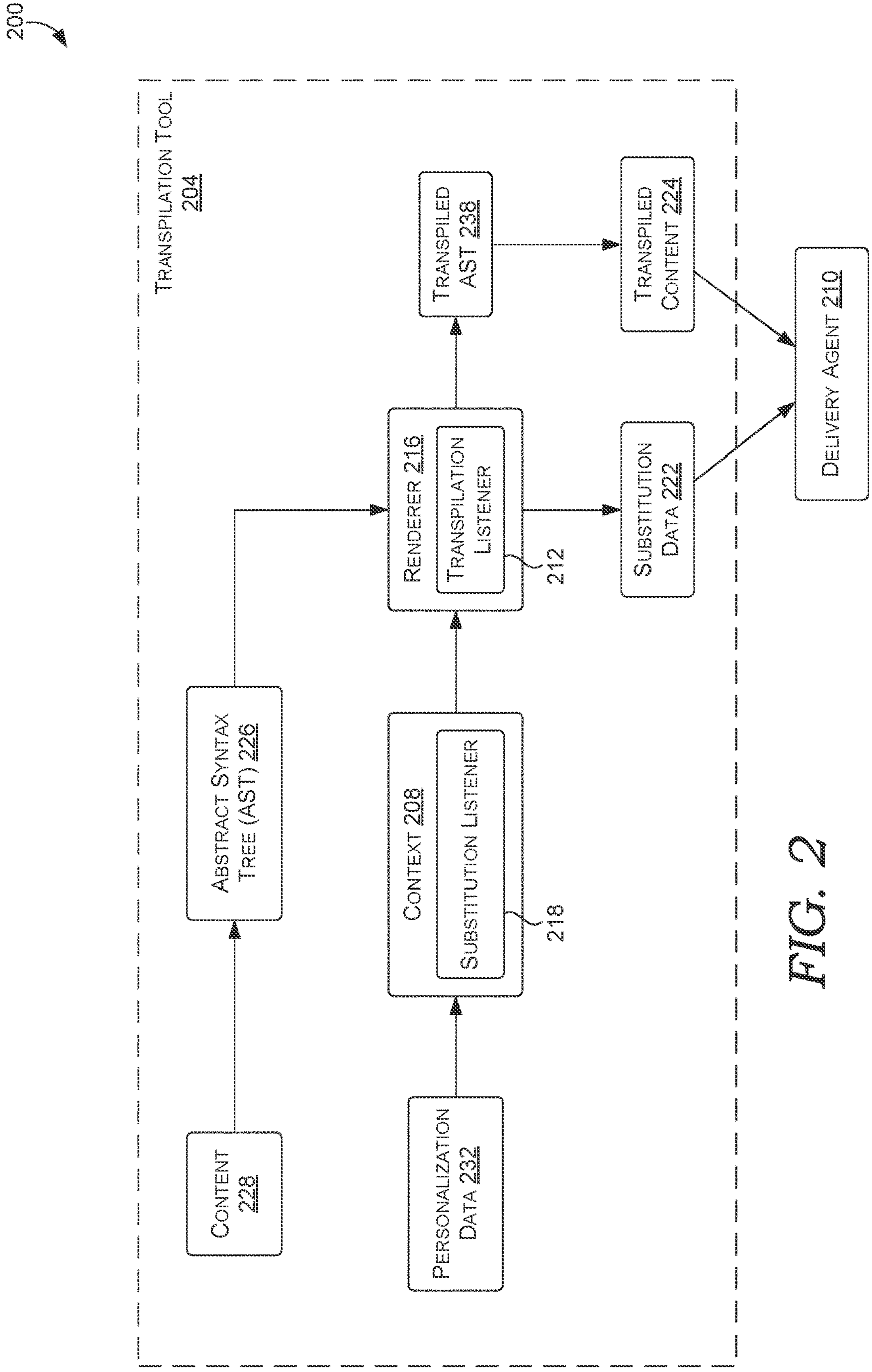
FIG. 2 depicts an environment in which transpiled content and substitution data are generated for use by one or more entities, in accordance with at least one embodiment.

FIG. 2 illustrates an environment 200 in which a transpilation tool 204 generates transpiled content 224 and substitution data 222 in accordance with an embodiment. The transpilation tool 204, in various embodiments, transpiles content 228 from a first programming language to a second programming language. As described above, for example, the content 228 is generated using a templating programming language and is to be transpiled or otherwise transformed to a delivery agent programming language to enable a delivery agent 210 to distribute personalized content. In an embodiment, the content 228 includes a template that the user of a journey management service (e.g., the journey management service 130 described above in connection with FIG. 1) generates for use in distribution of personalized communication to various recipients. In an example, the content 228 defines the rendering of the personalized communication such as location and content of personalization data 232 included in the personalized communication (e.g., name of recipient, type of promotional material, type of communication, style, tone, offers, etc.).

In an embodiment, the personalization data 232 includes user specific data maintained by the journey management service or other service. For example, the personalization data 232 includes information such as name, age, location, demographics, event history, purchases, interactions, interests, or any other information associated with users that can be used to generate personalized communications. In an embodiment, the content 228 is used to generate an abstract syntax tree (AST) 226. For example, the transpilation tool 204 or component thereof, such as a compiler, lexes and parses source code included in the content 228. In an embodiment, the transpilation tool 204 performs lexical analysis by at least taking a string of the content 228 (e.g., a portion of the source code) and converting the string into a stream of tokens, which includes the basic building blocks of the programming language such as language keywords, variables, literals, and operators. For example, for the string (e.g., an expression) "a.b+c," the transpilation tool 204 generates the tokens "a", ".", "b", "+", and "c."

Continuing, the transpilation tool 204 then performs syntax analysis, in accordance with at least one embodiment. For example, the transpilation tool 204 processes the stream of tokens produced during lexical analysis and converts the tokens into a structured form such as the AST 226, which represents the syntactic structure of the source code in a tree-like format. In various embodiments, the AST 226 is provided to a renderer 216 of the transpilation tool, the renderer including a transpilation listener 212 that generates a transpiled AST 238. In one example, the renderer 216 processes the AST 226 using a context 208 to render personalized content.

In various embodiments, the context 208 includes a data structure or other structured data object that includes values from the personalization data 232 to be included in the personalized content. For example, if the content 228 includes the variable "purchase.name," then the context 208 stores the value of the variable (e.g., "grocery") obtained from the personalization data 232. In various embodiments, a substitution listener 218 computes variable names and stores values associated with the context 208. For example, as the renderer 216 or other component of the transpilation tool 204 generates the context 208, the substitution listener 218 obtains the data stored in the context 208 (e.g., obtained from the personalization data and/or computed by the renderer, such as results of conditional statements) and generates substitution data 222.

In an embodiment, the substitution data is a JavaScript Object Notation (JSON) snippet that includes variable names and corresponding values (e.g., per personalization data). For example, the substitution data 222 is generated per customer based on the personalization data 232 associated with the customer. In various embodiments, the renderer 216 computes or otherwise determines what information from the personalization data 232 will be rendered or otherwise included in the personalized content. In one example, if the template indicates to insert the customer's name, the substitution data 222 is generated based on the personalization data 232 such that, when rendered, the substitution data 222 will cause the delivery agent 210 to insert the customer's name (e.g., the value corresponding to the variable name included in the substitution data 222). In another example, the content 228 indicates that if the customer has purchased apparel then the delivery agent 210 will render the personalized content to include new apparel marketing material. Continuing this example, the substitution data 222 for a customer whose personalization data 232 indicates the purchase of apparel will include a variable with the value "true," such that a renderer of the delivery agent 210 or other entity will evaluate the "if" statement correctly.

In various embodiments, the substitution listener 218 and the transpilation listener 212 compute variable names using an algorithm and/or naming convention. In one example, a naming convention is used to avoid duplication of variable names (e.g., unique variable names corresponding to conditional statement and/or control operation, row position, and column position based on grammar parsing and lexing rules associated with a programming language).

The transpilation listener 212, in various embodiments, performs a mapping of functions and/or operations between the source programming language (e.g., the templating programming language used to generate the content) and the destination programming language (e.g., the delivery agent programming language supported by the delivery agent 210). In one example, the mapping is performed based on the AST 226. For example, conditional statements are mapped between the AST 226 and the transpiled AST 238 (e.g., an "if" statement in the AST 226 is mapped to a corresponding structure in the transpiled AST 238 based on a set of rules).

Furthermore, in an embodiment, the transpiled AST 238 is generated by the transpilation listener 212, and the delivery agent 210 uses the transpiled AST 238 and the substitution data 222 to distribute the personalized communications. In other embodiments, the transpilation tool 204 generates transpiled content 224 by at least converting the transpiled AST 238 into source code (e.g., delivery agent programming language source code). For example, the delivery agent 210 generates machine-executable code based on the transpiled content 224 (or transpiled AST 238) and uses the substitution data 222 when rendering personalized content to determine the values associated with the variables in the transpiled content 224.

Figure 3:
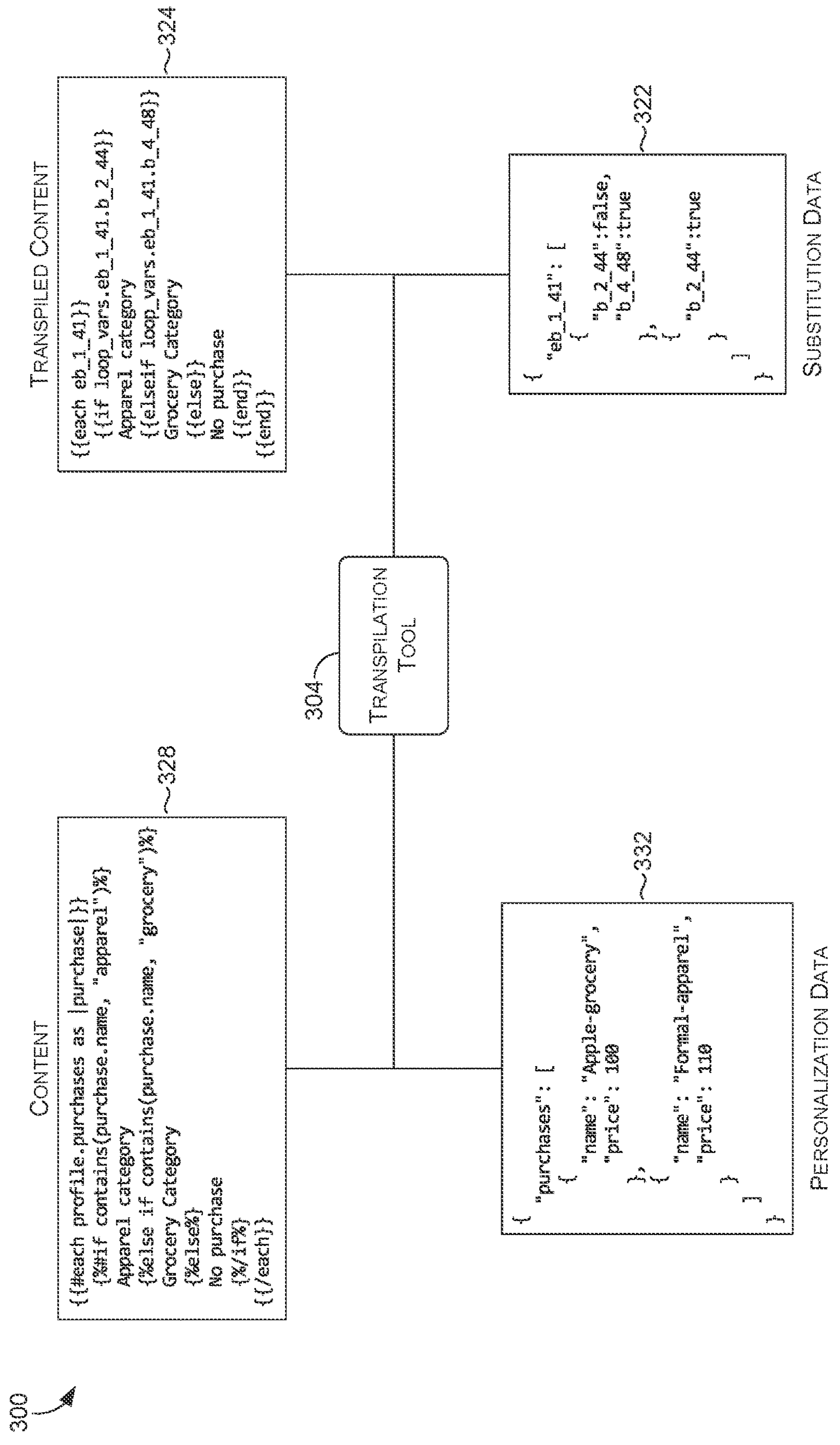
FIG. 3 depicts an environment in which transpiled content and substitution data are generated, in accordance with at least one embodiment.

FIG. 3 illustrates an environment 300 in which a transpilation tool 304 generates transpiled content 324 and substitution data 322, in accordance with an embodiment. In various embodiments, the transpiled content 324 is generated based on content 328. For example, the content 328 is generated by a user through a journey management service or other user interface. In an embodiment, the content 328 includes source code and/or logic that when processed by a renderer causes a computing device to generate personalized content based on personalization data. As illustrated in the example in FIG. 3, the content 328 includes the source code snippet and/or string "{{#each profile.purchases as |purchase|}" which represents logic that when processed by the computing device (e.g., compiled into machine-executable code) causes the computing device to perform the operation represented. Continuing this example, the computing device will process the personalization data 332 to perform the operation represented.

As described above, in an embodiment, the personalization data 332 include a variety of different information associated with customers. Furthermore, in such embodiments, the personalization data is stored in a structured data object such as a JavaScript Object Notation ("JSON") object. In one example, the JSON object includes nested fields corresponding to data regarding each event, which includes fields, such as time of the interaction, price of the product, location data for the customer (e.g., latitude and longitude, network address, physical store address, etc.), website address for the web page visited by the customer, product type, or any data that a business/marketer includes in an event of a journey. Further, in some embodiments, the events can include fields related to customer demographic information and can include the customer's geographical location, economic status, customer gender, customer age, or any other relevant demographic data collected regarding the customer.

In various embodiments, the transpilation tool 304 transpiles the content 328 to generate the transpiled content 324. In one example, the transpilation tool 304 generates an abstract syntax tree (AST) by at least lexing and parsing the content 328. Continuing this example, the AST is then transformed to a second AST based on the structure and grammar of a second programming language (e.g., the delivery agent programming language), and the second AST is converted to the transpiled content 324. In the example illustrated in FIG. 3, the transpiled content 324 includes the source code snippet or string "{{if loop_vars.eb_1_41.b_2_44}}," which is transpiled from the source code snippet and/or string "{% #if contains(purchase.name, "apparel")%}," where "b_2_44" is the variable name representing the result of processing the control block represented by "{{if loop_vars.eb_1_41.b_2_44}}." Furthermore, as illustrated in FIG. 3, the substitution data 322 includes a variable of the same name (e.g., "b_2_44"), which includes a result of processing the "if" statement based on the personalization data 332 (e.g., "false").

FIG. 4 illustrates an environment 400 in which a transpilation tool 404 generates transpiled content 424 and substitution data 422, in accordance with an embodiment. In various embodiments, the transpiled content 424 and substitution data 422 are generated based on content 428 and personalization data 432, as described above in connection with FIG. 3. In the example, illustrated in FIG. 4, the transpiled content 424 includes an "if" "else" statement control block represented in source code (e.g., "{{#if b_2_53}} . . . {{else}}"), which is transpiled from the source code snippet and/or string "{% #unless contains(trim(name.firstName),"Ferrari") %}" written in a templating programming language. Furthermore, as illustrated in FIG. 4, the transpiled content 424, in an example, includes a plurality of control blocks and/or conditional statements to represent a single control block and/or conditional statement from the content 428.

Figure 5:
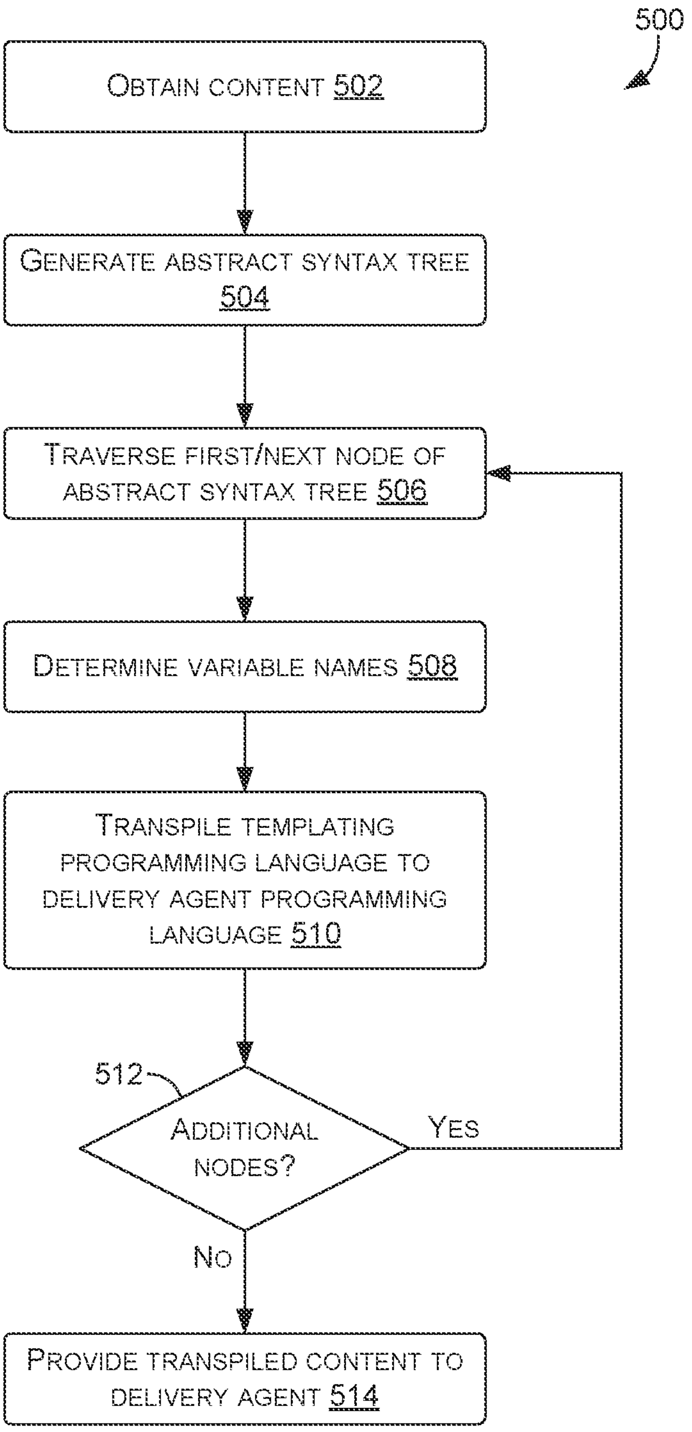
FIG. 5 depicts an example process flow for generating transpiled content, in accordance with at least one embodiment.

FIG. 5 is a flow diagram showing a method 500 for generating transpiled content in accordance with at least one embodiment. The methods 500, 600, and 700 can be performed, for instance, by the transpilation tool 104 and/or delivery agent 110 of FIG. 1. Each block of the methods 500, 600, and 700 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 502, the system implementing the method 500 obtains the content. As described above in connection with FIG. 1, in various embodiments, the user generates content which is used as a template for generating personalization content based on personalization data. In one example, the content is used to generate marketing material that is included in an email to a recipient based on personalization data associated with the recipient.

At block 504, the system implementing the method 500 generates an abstract syntax tree (AST). For example, a compiler or other component of the transpilation tool lexes and parses source code included in the content to generate the AST. At block 506, the system implementing the method 500 traverses the first and/or next node of the AST. For example, a renderer or other component of the transpilation tool starts at a root node of the AST and traverses all of the nodes of the AST in order to generate the personalized content. Continuing this example, during the process of rendering the personalized content, a substitution listener or other component of the transpilation tool collects data generated by the renderer.

At block 508, the system implementing the method 500 determines variable names. For example, as described above, a name convention is used to determine variable names associated with the content to enable the delivery agent to generate the personalized content. At block 510, the system implementing the method 500 transpiles the templating programming language to delivery agent programming language. For example, the AST is transformed to a second AST based on rules associated with the delivery agent programming language.

At block 512, the system implementing the method 500 determines if there are additional nodes of the AST. In an embodiment, if there are additional nodes, the system implementing the method 500 returns to block 506 and continues to traverse the AST. In other embodiments, if there are no additional nodes, the system implementing the method 500 continues to block 514. At block 514, the system implementing the method 500 provides the transpiled content to the delivery agent. For example, the transpilation tool provides the second AST (e.g., the AST generated based on the delivery agent programming language) to the delivery agent. In other examples, the transpilation tool generates source code in the delivery agent programming language based on the second AST and provides the source code to the delivery agent.

Figure 6:
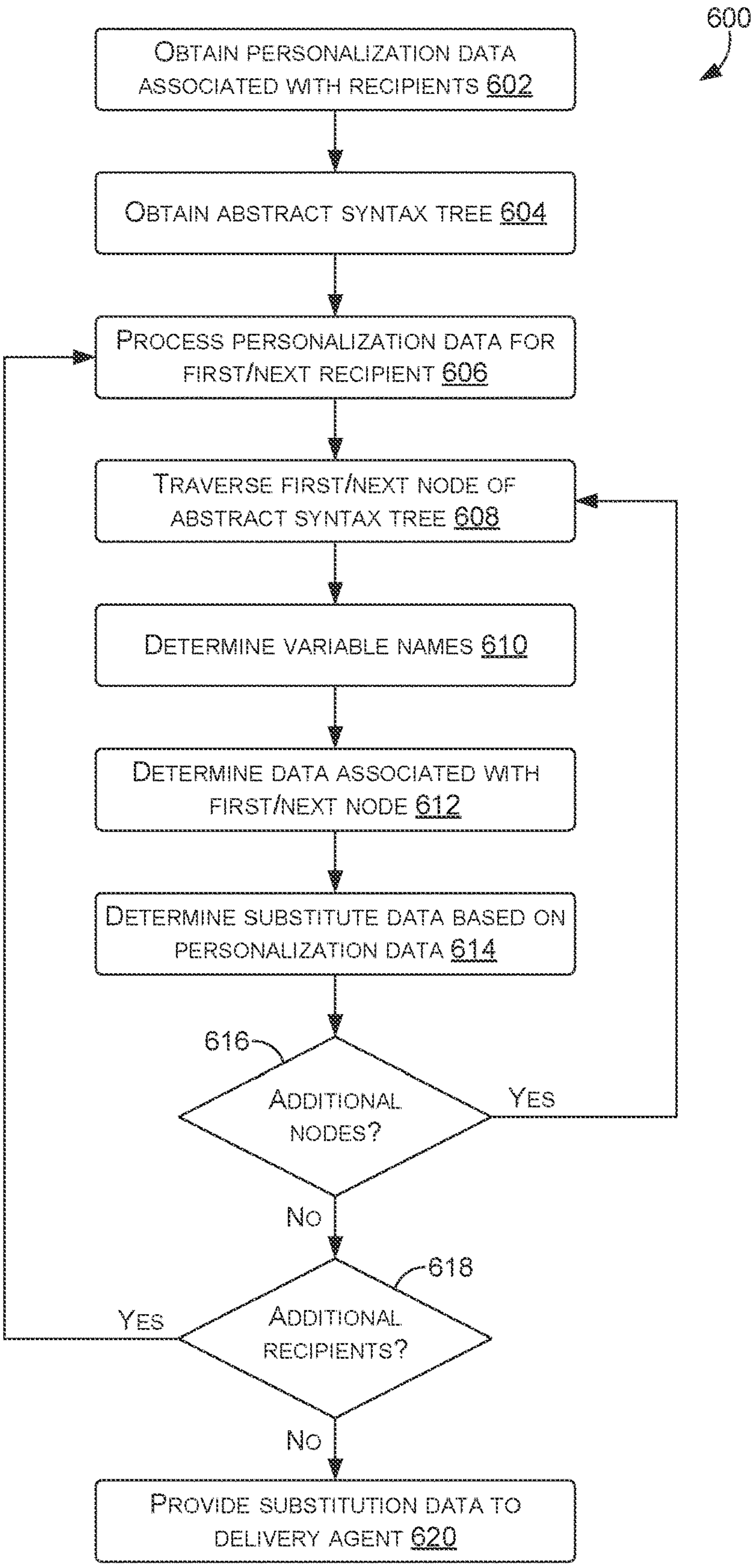
FIG. 6 depicts an example process flow for generating substitution data, in accordance with at least one embodiment.

FIG. 6 is a flow diagram showing a method 600 for generating substitution data in accordance with at least one embodiment. In various embodiments, the method 600 is performed by a renderer of the transpilation tool as part of the method 500 above to generate the transpiled content. In yet other embodiments, the method 600 is performed by the transpilation tool during generation of context, as described above in connection with FIG. 2. At block 602, the system implementing the method 600 obtains personalization data associated with recipients. For example, the user selects a plurality of customers to receive personalized content (e.g., promotional e-mail). Furthermore, in various embodiments, the personalization data is stored in a plurality of data stores maintained by a plurality of different sources (e.g., service provider, user, server computer system, on-premises computer system, etc.).

At block 604, the system implementing the method 600 obtains an abstract syntax tree (AST). For example, the AST is obtained by a renderer that generates the AST based on content (e.g., source code). At block 606, the system implementing the method 600 processes the personalization data for the first/next recipient. In one example, one instance of personalization data corresponds to one recipient, and the system implementing the method 600 generates the personalized content by processing each instance of personalization data separately.

At block 608, the system implementing the method 600 traverses the first/next node of the AST. For example, in order to process the personalization data, the system implementing the method 600 traverses the AST to determine or otherwise compute the personalized content. In one particular example, the system implementing the method 600 determines the result of a conditional statement represented by a node of the AST based on data included in the personalization data.

At block 610, the system implementing the method 600 determines variable names. For example, as described above, a name convention is used to determine variable names associated with the content to enable the delivery agent to generate the personalized content. At block 612, the system implementing the method 600 determines data associated with the first/next node. For example, the system implementing the method 600 determines inputs, outputs, and values determined within the nodes. At block 614, the system implementing the method 600 determines the substitute data based on the personalization data. Returning to the example above, for a node that includes a conditional statement, the system implementing the method 600 determines the result of the conditional statement based on the personalization data and stores that results as substitution data.

At block 616, the system implementing the method 600 determines if there are additional nodes of the AST. In an embodiment, if there are additional nodes, the system implementing the method 600 returns to block 608 and continues to traverse the AST. In other embodiments, if there are no additional nodes then the system implementing the method 600 continues to block 618. At block 618, the system implementing the method 600 determines if there are additional recipients. In an embodiment, if there are additional recipients, the system implementing the method 600 returns to block 606 and continues to generate substitution data. In other embodiments, if there are no additional recipients then the system implementing the method 600 continues to block 620. At block 620, the system implementing the method 600 provides the substitution data to the delivery agent. For example, the transpilation tool provides the substitution data to the delivery agent to enable the delivery agent to render the personalized content based on the substitution data and the transpiled content.

Figure 7:
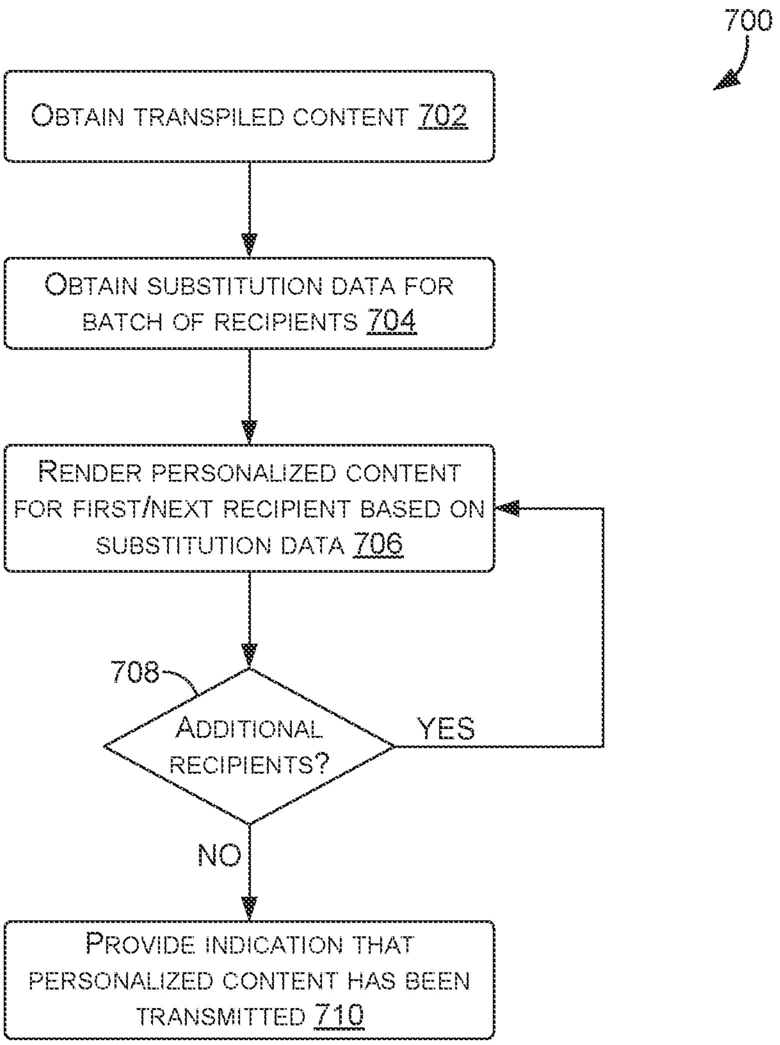
FIG. 7 depicts an example process flow for delivering rendered content based on transpiled content and substitution data, in accordance with at least one embodiment.

FIG. 7 is a flow diagram showing a method 700 for generating personalized content in accordance with at least one embodiment. In one embodiment, the method 700 is performed by the delivery agent 110 described above in connection with FIG. 1. At block 702, the system implementing the method 700 obtains transpiled content. For example, content generated by a user is transpiled by a transpilation tool for use by the delivery agent. At block 704, the system implementing the method 700 obtains substitution data for a batch of recipients. In one example, a plurality of recipients are selected to receive personalized content and substitution data is generated based on the content and personalization data.

At block 706, the system implementing the method 700 renders personalized content for the first/next recipient based on the substitution data. For example, the substitution data include the results of control blocks (e.g., conditional statements) and data to be included in the personalized content (e.g., the recipients' names). In such examples, the renderer processes the transpiled content using the substitution data. At block 708, the system implementing the method 700 determines if there are additional recipients. In an embodiment, if there are additional recipients, the system implementing the method 700 returns to block 706 and continues to generate personalized content. In other embodiments, if there are no additional recipients then the system implementing the method 700 continues to block 710. At block 710, the system implementing the method 700 provides an indication that the personalized content has been transmitted. For example, the delivery agent provides a notification to a journey management service that the personalized content has been rendered and transmitted.

Figure 8:
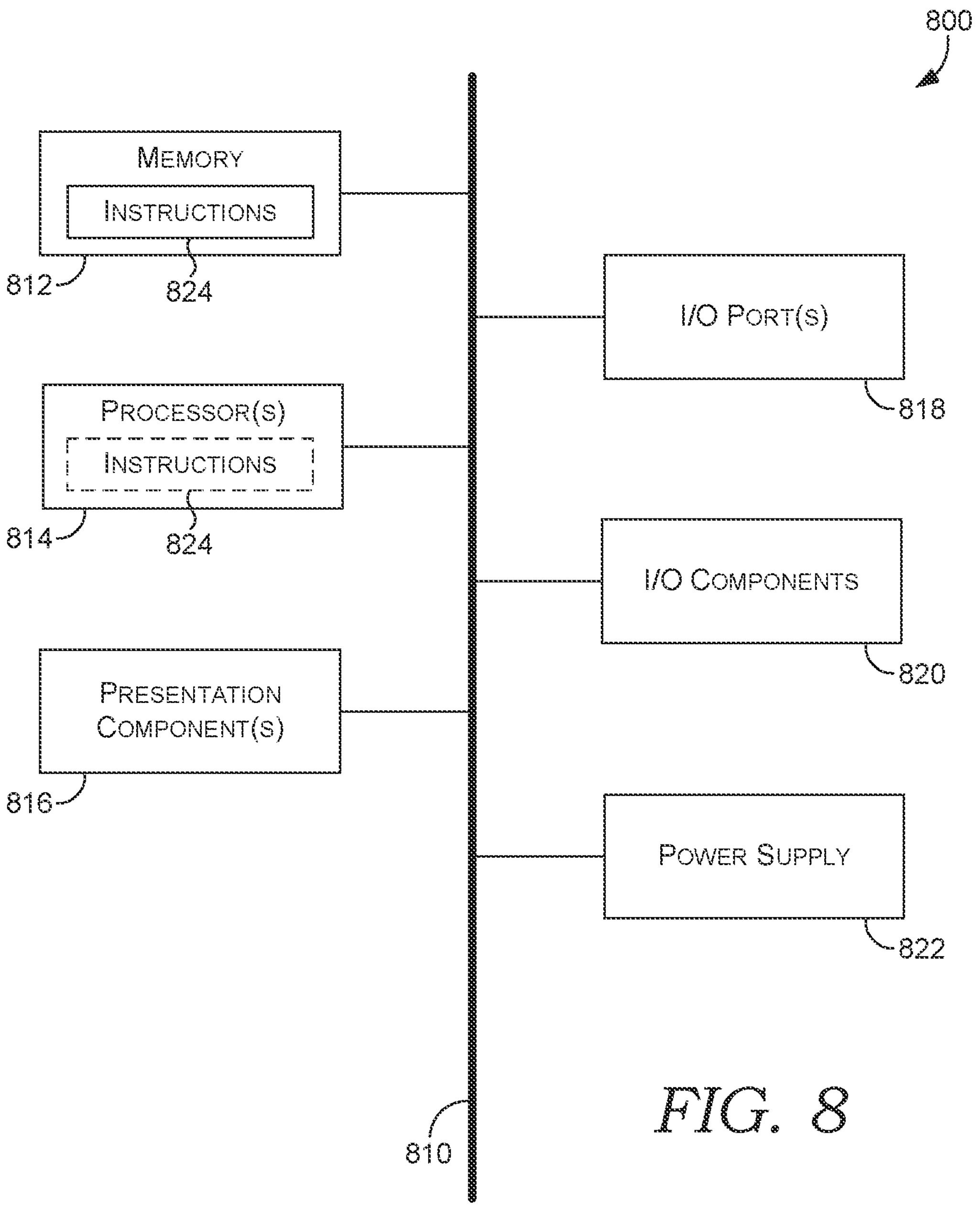
FIG. 8 is a block diagram of an exemplary computing environment suitable for use in implementations of the present disclosure.

Having described embodiments of the present disclosure, FIG. 8 provides an example of a computing device in which embodiments of the present disclosure may be employed. Computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 8 is merely illustrative of an exemplary computing device that can be used in connection with one or more embodiments of the present technology. Distinction is not made between such categories as "workstation," "server," "laptop," "handheld device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. As depicted, memory 812 includes instructions 824. Instructions 824, when executed by processor(s) 814 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 800. Computing device 800 may be equipped with depth cameras, such as stereoscopic camera systems, infrared camera systems, RGB camera systems, and combinations of these, for gesture detection and recognition. Additionally, computing device 800 may be equipped with accelerometers or gyroscopes that enable detection of motion. The output of the accelerometers or gyroscopes may be provided to the display of computing device 800 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A method comprising:

obtaining, by a transpilation tool, content generated using a first programming language supported by a journey management service;

obtaining, by the transpilation tool, personalization data associated with a set of recipients;

generating, by the transpilation tool, a first abstract syntax tree based on the content in the first programming language;

rendering, by a renderer, the content in the first programming language using the personalization data to generate a context data structure that includes a portion of the personalization data and results of evaluating control operations represented in the first abstract syntax tree;

transpiling, by the transpilation tool, the content to a second programming language supported by a delivery agent to generate transpiled content by at least, for nodes of the first abstract syntax tree:

converting the nodes of the first abstract syntax tree to nodes of a second abstract syntax tree;

determining a set of variable names, the set of variable names corresponding to variables associated with the nodes of the first abstract syntax tree; and generating substitution data associated with the set of variable names based on the personalization data associated with the set of recipients and the first abstract syntax tree by obtaining, from the context data structure during traversal of the first abstract syntax tree, (i) a set of values for substitution into the transpiled content based on the set of variable names and (ii) results of the evaluated control operations for use by the delivery agent during rendering of the transpiled content; and providing, by the transpilation tool, the transpiled content and the substitution data to the delivery agent.

2. The method of claim 1, wherein converting the nodes of the first abstract syntax tree to the nodes of the second abstract syntax tree further includes converting an operation in a first syntax of the first programming language represented by a first node of the first abstract syntax tree to a plurality of operations in a second syntax of the second programming language represented by a plurality of nodes in the second abstract syntax tree.

3. The method of claim 1, wherein transpiling the content to generate the transpiled content further includes generating the transpiled content based on the second abstract syntax tree.

4. The method of claim 1, wherein the set of variable names are determined based on an operation represented by a node of the first abstract syntax tree and a location of the node within the first abstract syntax tree.

5. The method of claim 1, wherein generating the substitution data further comprises computing an output of a node of the first abstract syntax tree based on the personalization data, wherein the output corresponds to a value of the set of values for substitution into the transpiled content.

6. The method of claim 1, wherein the substitution data include a structure data object.

7. The method of claim 1, wherein the method further includes causing the delivery agent to generate a set of rendered content for delivery to the set of recipients by at least rendering the set of rendered content based on the transpiled content and the substitution data.

8. A non-transitory computer-readable medium storing executable instructions embodied thereon that, as a result of being executed by a processing device, cause the processing device to:

retrieve, from a data store, content in a first programming language;

transpile, by a transpilation tool, the content from the first programming language to a second programming language by:

generating a first abstract syntax tree based on the content in the first programming language; and generating, by a transpilation listener, transpiled content by at least converting the first abstract syntax tree to a second abstract syntax tree associated with the second programming language;

retrieve, from the data store, personalization data associated with a recipient;

rendering, by a renderer, the content in the first programming language based on the personalization data to generate a data structure that includes values obtained from the personalization data and results of evaluating operations represented in the first abstract syntax tree;

generate, by a substitution listener, substitution data by at least traversing the first abstract syntax tree and determining the results associated with a set of variables of the first abstract syntax tree based on the data structure that includes values obtained from the personalization data; and provide, to a delivery agent, the transpiled content and the substitution data, wherein the transpiled content and the substitution data causes the delivery agent to generate personalized content and to communicate the personalized content over a network to a remote computing device of the recipient.

9. The medium of claim 8, wherein a first node of the first abstract syntax tree represents a first conditional statement included in the content.

10. The medium of claim 9, wherein converting the first abstract syntax tree to the second abstract syntax tree further includes converting the first node to a plurality of nodes of the second abstract syntax tree representing a plurality of conditional statements to perform an operation of the first conditional statement.

11. The medium of claim 10, wherein a variable of the set of variables indicates a result of a conditional statement of the plurality of conditional statements based on the personalization data.

12. The medium of claim 11, wherein the variable and the result are included in the substitution data.

13. The medium of claim 8, wherein instructions further include instructions, that, as a result of being executed by the processing device, cause the processing device to:

cause the delivery agent to generate rendered content based on the transpiled content and the substitution data; and cause the delivery agent to transmit the rendered content to the recipient.

14. The medium of claim 13, wherein instructions further include instructions, that, as a result of being executed by the processing device, cause the processing device to:

obtain second personalization data associated with a second recipient;

generate, by the substitution listener, second substitution data by at least traversing the first abstract syntax tree and determining results associated with the set of variables of the first abstract syntax tree based on the second personalization data; and provide the second personalization data to the delivery agent based on the second substitution data.

15. The medium of claim 14, wherein providing the second personalization data to the delivery agent causes the delivery agent to transmit second rendered content to the second recipient, where the second rendered content is generated based on the second personalization data.

16. A system comprising:

a journey management device having a first memory component and a first processing device coupled to the first memory component to perform operations comprising:

obtaining content in a first programming language;

generating transpiled content by at least converting a first abstract syntax tree to a second abstract syntax tree, wherein the first abstract syntax tree is based on the content and represents a first syntax of the first programming language and the second abstract syntax tree represents a second syntax of a second programming language;

generating substitution data by at least rendering the content in the first programming language based on personalization data to obtain values from the personalization data and traversing the first abstract syntax tree to determine results of evaluating operations represented in the first abstract syntax tree; and a delivery agent device having a second memory component and a second processing device coupled to the second memory component to perform operations comprising:

obtaining the transpiled content and the substitution data; and generating a plurality of personalized content based on the transpiled content and the substitution data to communicate the plurality of personalized content over a network to remote computing devices of a plurality recipients.

17. The system of claim 16, wherein the first programming language includes a templating programming language supported by a journey management service.

18. The system of claim 17, wherein the second programming language include a delivery agent programming language supported by a delivery agent.

19. The system of claim 18, wherein the templating programming language provides additional functionality relative to the delivery agent programming language.

20. The system of claim 16, wherein generating the plurality of personalized content based on the transpiled content and the substitution data further comprises rendering the plurality of personalized content.

* * * * *